US009961571B2

(12) United States Patent
Yang et al.

(10) Patent No.: US 9,961,571 B2
(45) Date of Patent: May 1, 2018

(54) SYSTEM AND METHOD FOR A MULTI VIEW LEARNING APPROACH TO ANOMALY DETECTION AND ROOT CAUSE ANALYSIS

(71) Applicant: Futurewei Technologies, Inc., Plano, TX (US)

(72) Inventors: Kai Yang, Bridgewater, NJ (US); Ruilin Liu, Hillsborough, NJ (US); Yanjia Sun, Downingtown, PA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days. days.

(21) Appl. No.: 14/864,360

(22) Filed: Sep. 24, 2015

(65) Prior Publication Data

US 2017/0094537 A1    Mar. 30, 2017

(51) Int. Cl.
*H04Q 7/10* (2006.01)
*H04W 24/04* (2009.01)

(52) U.S. Cl.
CPC .................................. *H04W 24/04* (2013.01)

(58) Field of Classification Search
CPC .... H04W 24/08; H04W 24/06; H04L 41/142; H04L 41/147; H04L 43/022
USPC .......................... 455/422; 370/242; 705/7.38
See application file for complete search history.

(56) References Cited

U.S. PATENT DOCUMENTS

| | | | | |
|---|---|---|---|---|
| 7,689,455 B2 * | 3/2010 | Fligler | ................... | G06Q 30/02 |
| | | | | 705/7.38 |
| 9,069,338 B2 * | 6/2015 | Drees | ..................... | G05B 15/02 |
| 9,424,121 B2 * | 8/2016 | Kushnir | ................. | G06F 11/079 |
| 2010/0027432 A1 * | 2/2010 | Gopalan | ............... | H04L 41/142 |
| | | | | 370/252 |
| 2014/0137136 A1 * | 5/2014 | Zhang | ..................... | G06F 9/542 |
| | | | | 719/318 |
| 2014/0256310 A1 | 9/2014 | Wang et al. | | |
| 2015/0134622 A1 | 5/2015 | Ebel et al. | | |
| 2015/0199636 A1 * | 7/2015 | Gil | .......................... | G06Q 50/30 |
| | | | | 705/7.39 |
| 2016/0088502 A1 * | 3/2016 | Sanneck | ............... | H04W 24/08 |
| | | | | 370/242 |

FOREIGN PATENT DOCUMENTS

| CN | 102647306 A | 8/2012 |
|---|---|---|
| CN | 103138963 A | 6/2013 |

OTHER PUBLICATIONS

Korn, et al., "Understanding Data Completeness in Network Monitoring Systems," 2012 IEEE 12th International Conference on Data Mining, pp. 359-368.

* cited by examiner

*Primary Examiner* — Kathy Wang-Hurst
*Assistant Examiner* — Julio Perez
(74) *Attorney, Agent, or Firm* — Slater Matsil, LLP (57) ABSTRACT

A system and method for detecting anomalies in a communication network includes detecting first outliers in a first set of quality indicators for a cellular group, detecting second outliers in a second set of performance indicators for the cellular group, correlating the first outliers and the second outliers to produce an anomaly candidate, determining a confidence threshold for the anomaly candidate, and indicating a network anomaly in response to the confidence threshold exceeding a predetermined threshold.

23 Claims, 9 Drawing Sheets

SYSTEM AND METHOD FOR A MULTI VIEW LEARNING APPROACH TO ANOMALY DETECTION AND ROOT CAUSE ANALYSIS

TECHNICAL FIELD

The present invention relates generally to a system and method for managing the allocation of resources in a network, and in particular embodiments, a system and method for a multi view learning approach to anomaly detection and root cause analysis in a communication network.

BACKGROUND

In network elements of a radio access network, such as base stations (or NodeBs or eNodeBs or cells) or radio network controllers (RNCs) of a communication system, anomalies occur occasionally. An example of an anomaly includes a cell outage (e.g., a sleeping cell). These anomalies may be indicated by key performance indicators (KPIs) with unusually poor (low or high) values, and/or by key quality indicators (KQI) with unusually poor (low or high) values. Anomalies may also occur in the form of unusual or broken relationships or correlations observed between sets of variables.

An anomaly has a root cause, such as a malfunctioning user equipment (UE) or network element, interference, and/or resource congestion from heavy traffic. In particular the bottleneck may be, e.g., the uplink received total wideband power, downlink bandwidth (codes or resource blocks), uplink bandwidth (resource blocks), backhaul bandwidth, channel elements (CE), control channel resources, etc.

SUMMARY OF THE INVENTION

Technical advantages are generally achieved, by embodiments of this disclosure which describe a multi view learning approach to anomaly detection and root cause analysis in a communication network.

In accordance with an embodiment, a method for detecting anomalies in a communication network is provided. The method includes detecting first outliers in a first set of quality indicators for a cellular group, detecting second outliers in a second set of performance indicators for the cellular group, correlating the first outliers and the second outliers to produce an anomaly candidate, determining a confidence threshold for the anomaly candidate, and indicating a network anomaly in response to the confidence threshold exceeding a predetermined threshold.

In accordance with another embodiment, a method of root cause analysis is provided. The method includes detecting candidate outlier events for respective ones of a plurality of sets of indicators for a communication network, the plurality of sets of indicators including at least one set of performance indicators and one set of quality indicators, correlating the candidate outlier events according to time to produce a set of outlier events, indicating a network anomaly when the set of outlier events matches a criteria, and producing a root cause according to the network anomaly.

In accordance with yet another embodiment, an anomaly detector is provided. The anomaly detector includes a processor and a non-transitory computer-readable storage medium storing a program to be executed by the processor. The program includes instructions for detecting first outliers in a first set of quality indicators for a cellular group, detecting second outliers in a second set of performance indicators for the cellular group, correlating the first outliers and the second outliers to produce an anomaly candidate, determining a confidence threshold for the anomaly candidate, and indicating a network anomaly in response to the confidence threshold exceeding a predetermined threshold

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Disclosed herein is an approach to diagnosing root causes of network anomalies by correlating outliers detected in different performance or quality indicators for a network. An embodiment method detects anomalies and the root causes of the anomalies. Root causes of anomalies may include malfunctioning user equipment (UE) or network elements, interference, resource congestion from heavy traffic, and the like. In particular, the bottleneck may be downlink power, uplink received total wideband power, downlink bandwidth (codes or resource blocks), uplink bandwidth (resource blocks), backhaul bandwidth, channel elements, (CE), control channel resources, etc. It is desirable to detect and determine the root causes of anomalies.

Some anomaly detection methods disclosed herein select thresholds for variables or distance metrics yielding a decision boundary based on training and testing data to determine outliers that represent anomalies. However, detection of outliers of a single metric may yield false positives or missed anomalies. An embodiment method more accurately detects anomalies by correlating outliers across multiple metrics. When the outliers across several metrics correlate, a network anomaly may be more strongly indicated. When outliers across the several metrics do not correlate, a false positive may be indicated.

An embodiment method detects successive outliers in a performance or quality metric and labels the outliers as an event if the time difference between them is less than a predetermined threshold. After detecting events across multiple metrics using this technique, the events are correlated. Any events that have a time overlap greater than a predefined threshold are associated and classified as a network anomaly. A root cause may be determined according to the metrics analyzed to detect the anomaly events.

Another embodiment method defines a time interval and detects outliers across multiple metrics in that time interval. Detected outliers in a metric are classified as rich or poor outliers according to the quantity of outliers detected in the time interval. The rich outliers are summed into a running total, and then the poor outliers are subtracted from the running total until the running total equals or is close to zero. A higher ratio of summed rich and poor outliers to the total quantity of detected outliers can indicate the presence of a network anomaly in the chosen time interval. Possible causes for the anomalies may be revealed. The root cause may be determined based on the metrics considered, or may also be determined based on a network operator's judgment. By simultaneously conducting outlier detection and correlation across multiple metrics, the performance and accuracy of anomaly detection may be improved. Multi-view detection and correlation of anomalies is a low-complexity technique that can be performed quickly, making it ideal for real-time analysis and diagnosis of network performance and quality.

Figure 1:
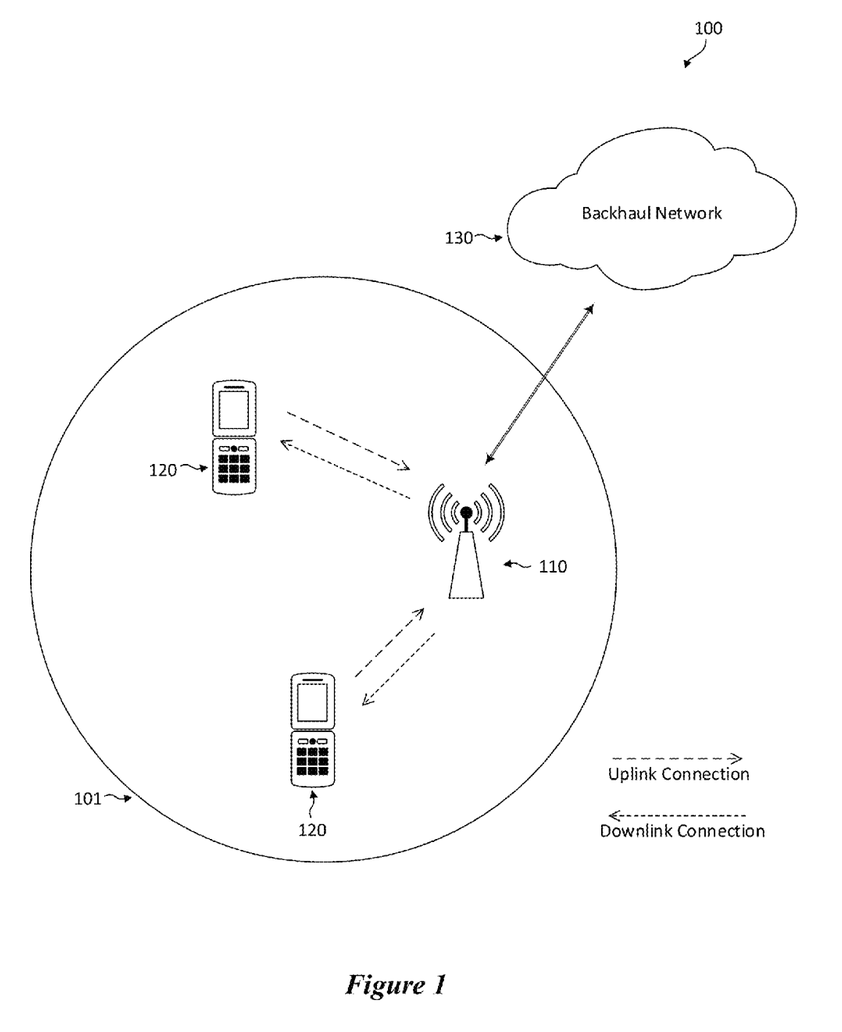
FIG. 1 illustrates a diagram of an embodiment wireless communications network.

FIG. 1 illustrates a network 100 for communicating data. The network 100 comprises a base station 110 having a coverage area 101, a plurality of mobile devices 120, a backhaul network 130, and an anomaly detector 140. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macrocell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
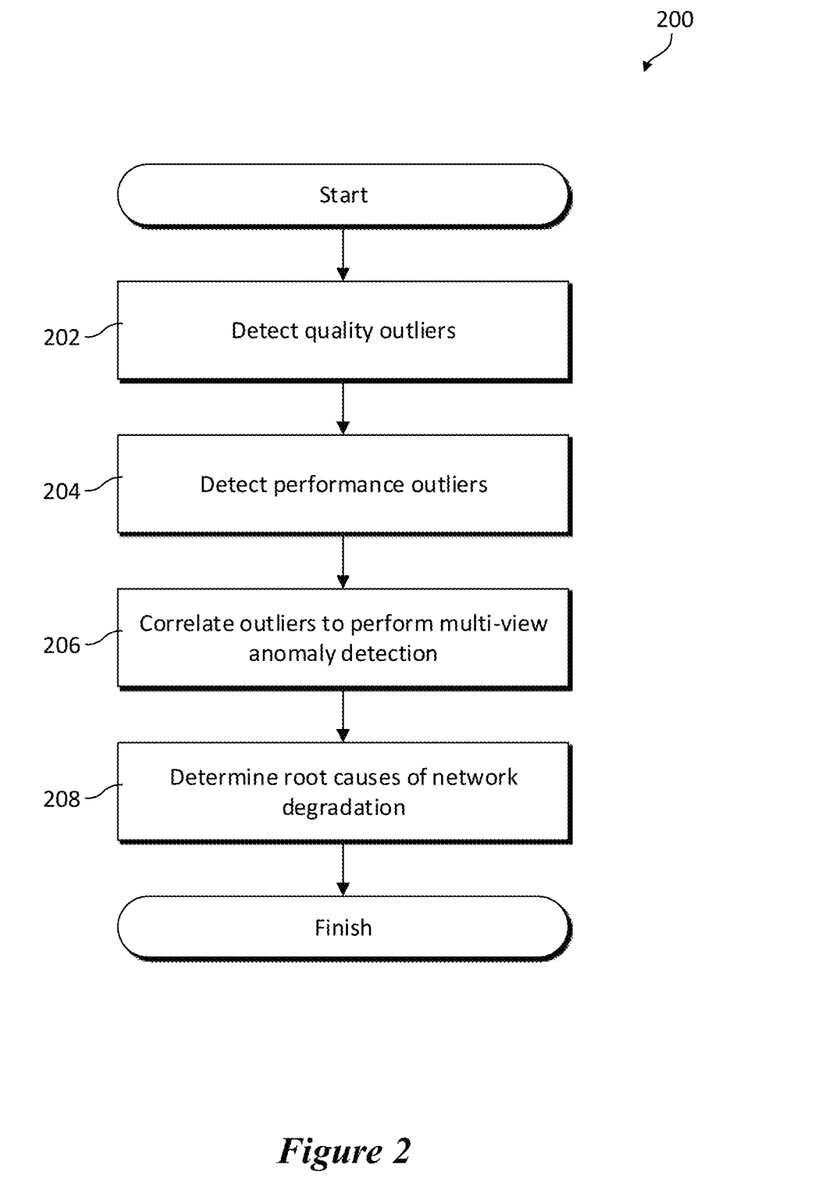
FIG. 2 illustrates an embodiment method of multi-view root cause detection.

FIG. 2 illustrates an embodiment multi-view root cause detection method 200. The multi-view root cause detection method 200 may be indicative of operations occurring in the anomaly detector 140. In some embodiments, the anomaly detector 140 may be a standalone device. The anomaly detector 140 may be co-located with another device in the network 100, such as base station 110, a core network mobility management entity (MME), and/or a serving gateway (SGW). It may also be software executed on a personal computer in the network 100 and/or be part of a customer experience management toolkit.

The multi-view root cause detection method 200 begins by detecting quality outliers from a set of quality metrics (step 202). The quality metrics may be data that is sampled in real time from the network 100, or may be data that was previously captured to a data file. The quality metrics may comprise key quality indicators (KQIs). KQIs may include metrics such as a throughput rate, in kilobits per second (kbps). Additionally, KQIs may include other metrics such as initial duration of a file download, delay in starting a download of content, and/or the like. The quality metrics are analyzed to detect one or more outliers, for correlation with outliers from other metrics. The quality metrics are separated into streams of KQI data for each cellular group or element in the network 100. Each KQI stream is then passed through an outlier detector that detects abnormal behaviors and patterns in the KQI stream.

The multi-view root cause detection method 200 then detects performance outliers from a set of performance metrics (step 204). The performance metrics may be data that is sampled in real time from the network 100, or may be data that was previously captured to a data file. The performance metrics may comprise key performance indicators (KPIs). KPIs may include metrics such as total download packet switched bits. Additionally, KPIs may include metrics such as the TCP utility ratio, control element congestion counters, poor coverage ratio counters, and/or the like. The performance metrics are analyzed to detect one or more performance outliers, for correlation with outliers from other metrics, such as the quality outliers detected in step 202. Detecting the performance outliers may be performed in a manner similar to that of detecting the quality outliers. Conversely, detecting the performance outliers may be accomplished using a different detection method than that of the quality outliers.

Note that, while FIG. 2 shows the detection of quality outliers (step 202) occurring before the detection of performance outliers (step 204), these steps could occur in another order. For example, an embodiment method may detect performance outliers before or at the same time as detecting quality outliers. Likewise, in an embodiment method, other steps may occur between the detection of quality outliers and the detection of performance outliers. After the quality and performance outliers are detected, the multi-view root cause detection method 200 continues by combining the quality and performance outliers. Once combined, the outliers may be correlated to perform multi-view anomaly detection (step 206), which detects anomalies in the network 100.

Once multi-view anomaly detection has been performed and anomalies have been identified, the multi-view root cause detection method 200 concludes by determining the root causes of network degradation according to the identified anomalies (step 208). Root causes may be determined according to the performance metrics or quality metrics analyzed. In other words, correlated outliers in certain types of KPI or KQI streams may point to certain types of root causes. For example, a low throughput rate may indicate one type of root cause, while a high latency may indicate a different root cause. In some embodiments, this root cause analysis may be performed in real time, e.g., during outlier detection and correlation, so that the network 100 may be corrected and tuned as problems are detected in the network. Alternatively, the root causes may be determined by a network operator in accordance with the identified anomalies and the operator's knowledge of the network 100.

Figure 3:
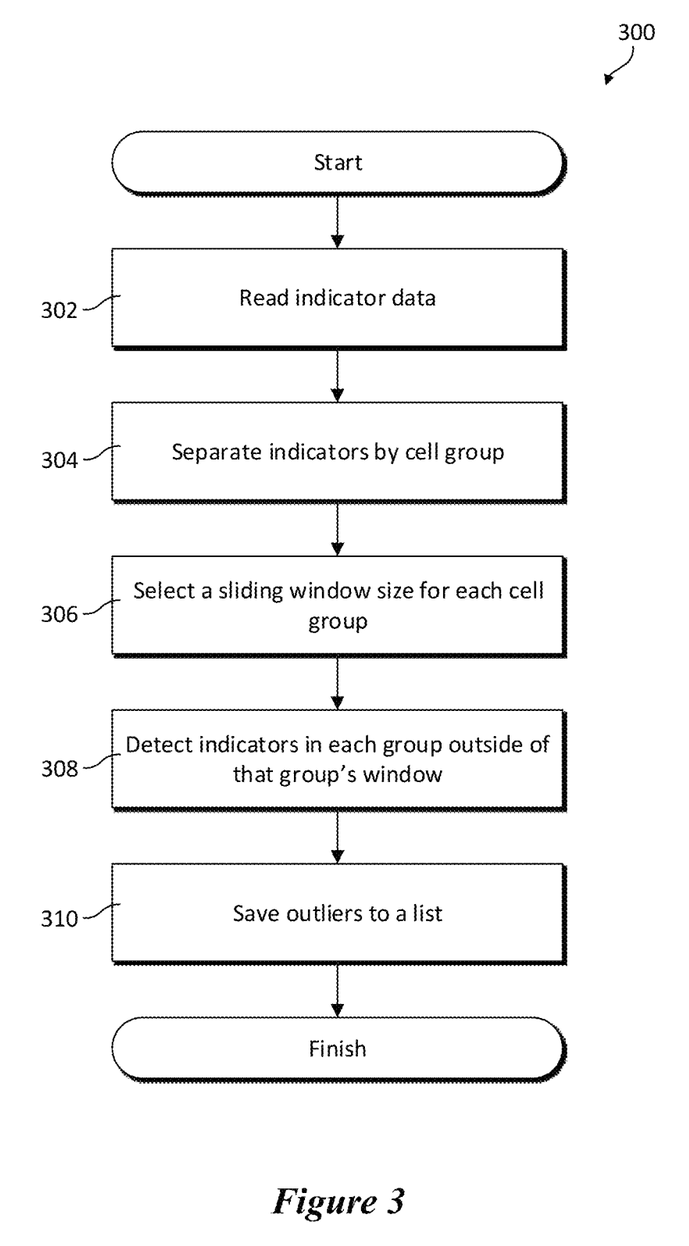
FIG. 3 illustrates an embodiment method of detecting KPI or KQI outliers.

FIG. 3 illustrates an example outlier detection algorithm 300 for detecting outliers in a stream of quality or performance metrics. Outlier detection algorithm 300 may be indicative of operations occurring in the anomaly detector 140. Outlier detection algorithm 300 may detect outliers in a performance or quality indicator stream, as discussed above with respect to steps 202 and 204 of FIG. 2.

Outlier detection algorithm 300 beings by reading indicator data (step 302). The indicator data may be, e.g., indicators from a quality or performance indicator stream. As discussed above, the data could be data captured in real time, or the data could be analyzed after being capturing by a network tool. The indicator data may be a combined data file, containing streams of quality or performance indicators for several cellular groups in the network 100. If so, the streams may be separated by cellular group (step 304), and each stream may be analyzed separately for outliers. The data may be pre-processed before detection proceeds. For example, bad data may be removed from the streams. Alternatively, a network engineer may filter the data based on desired metrics to be analyzed and/or the network issues being investigated for root causes.

Once the streams have been separated by cellular group, outlier detection algorithm 300 continues by selecting a window size for each stream (step 306). The window size may be a sliding window determined according to timeslot clustering for each indicator stream. The window size may be determined several ways. In some embodiments, the window size may be predetermined according to known values, e.g., values determined from data measured in a laboratory. In some embodiments, a network operator analyzing the network 100 for performance issues may configure the window size according to their expertise and judgment.

The window size may be a maximum deviation from an ideal value, expressed as a percentage. The ideal value and deviation percentage may be determined according to training and testing data from the network 100, which may include prior and/or predicted future data. For example, the window size may be selected according to a prediction based on several days' worth of training and testing data. Once the window size, in value and deviation percentage, is chosen, a top and bottom threshold may be calculated. These thresholds are used to separate outliers from normal indicator data. Because the window size selection may consider past, present, and predicted future data in real time, it is thus considered a learning approach.

Once a window size is selected, outlier detection algorithm 300 continues by detecting indicators in the indicator stream that are outside of the chosen window size (step 308). Observed indicators in the stream of quality or performance indicators that exceed the top threshold may be identified as outliers. Likewise, indicators below the bottom threshold may be identified as outliers. In some embodiments, an indicator may be identified as an outlier if it is above the top threshold or below the bottom threshold. In some embodiments, only the top or bottom threshold may be considered, according to the metric analyzed. For example, when analyzing some types of KQIs or KPIs (e.g., delay or latency indicators), an indicator may be labeled an outlier only if it exceeds the top threshold. Likewise, when analyzing other types of KPIs or KQIs (e.g., throughput indicators), an indicator may be labeled an outlier only if it is less than the bottom threshold. Selection of a window size and detection of outliers may then continue for each indicator stream in the source data.

One the outliers in each indicator stream are detected, the outlier detection algorithm 300 concludes by saving the outliers to a list (step 310). This list may constitute the outliers for the quality or performance data analyzed. As discussed above with respect to FIG. 2, outlier detection algorithm 300 may be performed once for each set of quality or performance data. For example, the outlier detection algorithm 300 may be performed once on KQI data, and then again on KPI data. The resulting list of outliers for each metric may then be saved and correlated.

Figure 4:
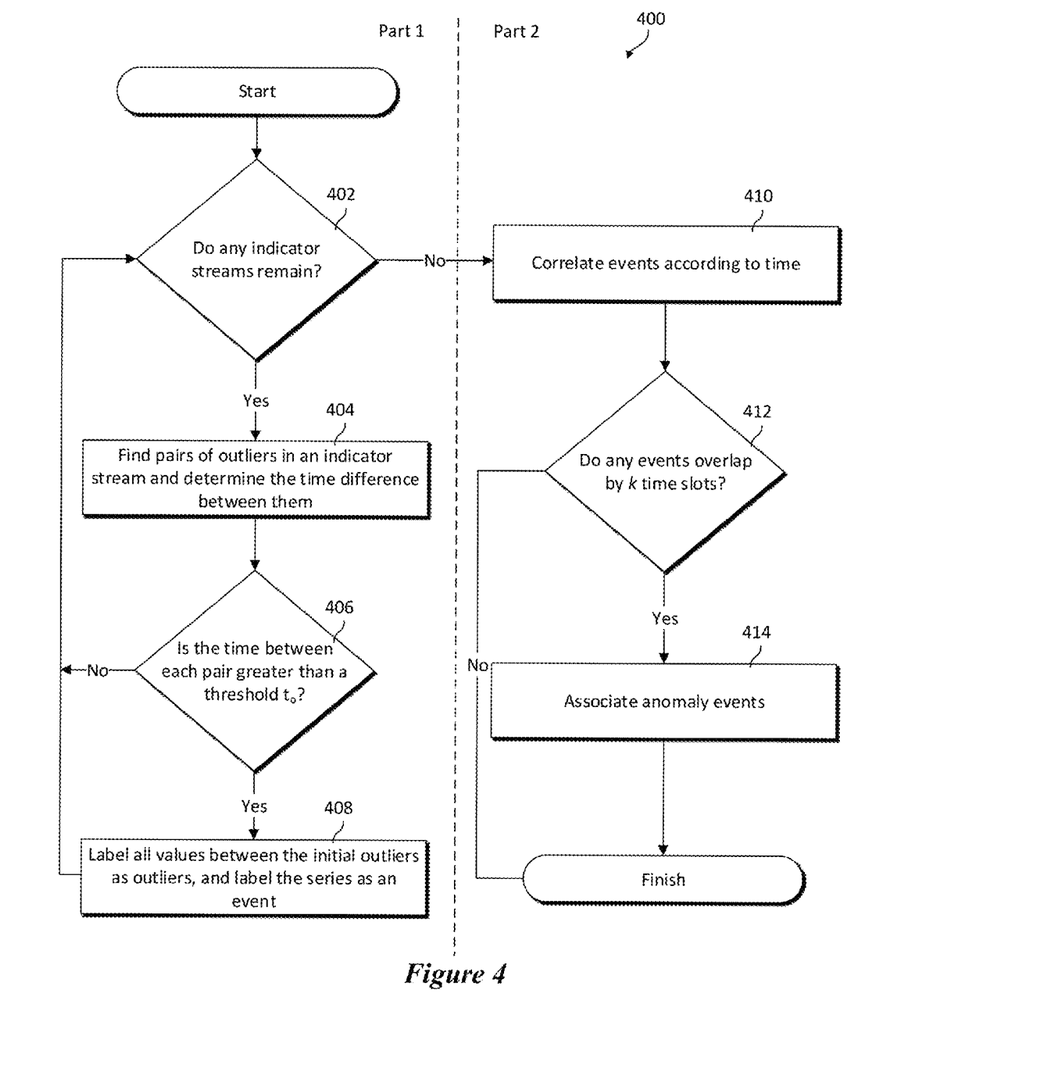
FIG. 4 illustrates a first embodiment method of correlating KPI and KQI outliers.

FIG. 4 illustrates a first embodiment outlier correlation method 400, which may correlate KPI and KQI outliers. Outlier correlation method 400 may be indicative of operations occurring when performing multi-view anomaly detection, as discussed above with respect to step 206 of FIG. 2. As shown in FIG. 4, the outlier correlation method 400, at a high level, consists of two parts: (1) detect outlier events in indicator streams (steps 402-408); and (2) determine if any outlier events overlap in time (steps 410-414). For example, part 1 may detect outlier events in a KPI stream and in a KQI stream, and then part 2 may determine if any of those events overlap in the time domain.

Outlier correlation method 400 begins by checking for indicator data streams to analyze for outliers (block 402). As discussed above with respect to FIG. 3, the source indicator data is separated into streams of indicators, and each stream may be scanned separately for outliers. Because each indicator data stream is analyzed separately, this check is performed and part 1 (steps 402-408) may be repeated for each indicator data stream present in the source data. Each stream of indicator data may be a quality metric or a performance metric. While the indicator streams are correlated according to time, it should be noted that the data in a stream of indicators may consist of discrete data points sampled at a given rate. Accordingly, in some embodiments, each data point in an indicator data stream corresponds to a time slot of $t_k$ width, representing the indicator data for that time slot. In other embodiments, the data may be a continuous signal that is not analyzed according to discrete time slots.

Once an indicator data stream is detected, outlier correlation method 400 continues by searching for pairs of outliers in the indicator data stream and computing the time spans between the outliers (step 404). An indicator data stream may contain multiple consecutive outliers, each with a time difference between them. For example, a stream may contain three consecutive outliers: $O_1$, $O_2$, and $O_3$. In this example, step 404 will detect two pairs of outliers and two corresponding time differences between them: the pairing between $O_1$ and $O_2$, resulting in time difference $t_{12}$ between them; and the pairing between $O_2$ and $O_3$, resulting in time difference $t_{23}$ between them. As discussed above, the time differences may be measured in discrete time slot units.

Once the time differences between outliers have been detected, outlier correlation method 400 continues by checking each time difference to determine if it is smaller than a predefined threshold $t_o$ (step 406). If a time difference is smaller than $t_o$, the outlier correlation method 400 continues. For each outlier pair with a time difference smaller than the threshold $t_o$, all of the indicators in the indicator data stream between the two outliers may also be labeled as outliers. Each of the series of outliers may then be labeled as an anomaly event (step 408). Once the sequences of outliers are labeled as anomaly events, or if no outliers have a time difference smaller than the threshold $t_o$, the outlier correlation method 400 checks for another indicator data stream and repeats part 1 of the method to analyze the stream for anomaly events (steps 402-408).

Once no indicator streams remain, the outlier correlation method 400 continues by correlating the anomaly events according to time (step 410). As discussed above, each outlier in an indicator data stream may correspond to a time slot of $t_k$ width. The outlier correlation method 400 continues by examining the anomaly events that have been correlated according to time, and determining if they overlap by a predefined quantity of time slots k (step 412). If two anomaly events overlap by k time slots, then the outlier correlation method 400 concludes by associating the anomaly events (step 414). If anomaly events are associated, then an anomaly has been detected in the network 100. If no events associate, then an anomaly probably has not been detected. Once anomalies have been detected, the outlier correlation method 400 concludes.

Figure 5A:
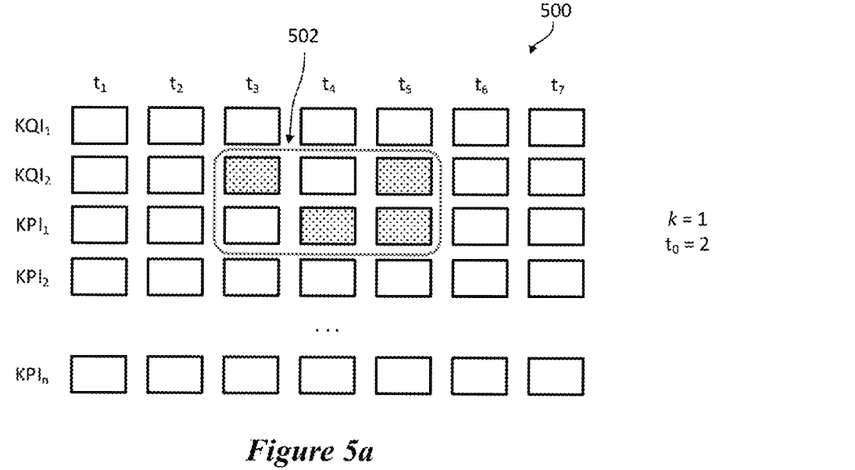
FIGS. 5a-5d illustrate an example of a first embodiment method of correlating KPI and KQI outliers.

FIGS. 5a-5d illustrate the outlier correlation method 400 as applied to data 500. As shown in FIG. 5a, there are several KPI and KQI streams in the data 500. Each of the KPI/KQI streams have been separately analyzed to detect outliers in the streams, which are indicated as boxes with dotted hash shading. The highlighted box 502 indicates a detected anomaly, as will be discussed below with respect to FIGS. 5b-5d.

Figure 5B:
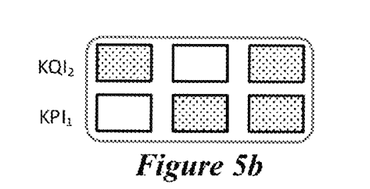
Figure 5C:
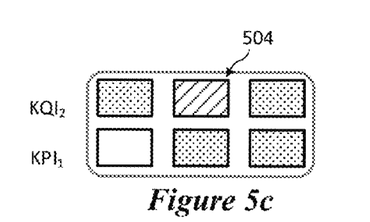

FIG. 5b is a close-up view of the subset of the data 500 that contains outliers. As shown in FIG. 5b, there are two indicator streams with outliers: $KQI_2$ and $KPI_1$. As can be seen, these outliers span three time slots. FIG. 5c illustrates the data 500 after processing by part 1 of the outlier correlation method 400. As seen in FIG. 5c, a normal indicator 504 lies between two outliers in the $KQI_2$ stream. Normal indicator 504, which is illustrated with diagonal hash lines, was not detected as an outlier when the $KQI_2$ stream was analyzed for outliers during part 1 of outlier correlation method 400. However, normal indicator 504 has been labeled as an outlier during part 2 of the outlier correlation method 400 since it falls within a sufficiently small quantity of time slots $t_o$ between two detected outliers of the $KQI_2$ stream. In this example, $t_o$ was predefined to be two time slots. Accordingly, because the time gap between the two detected outliers of the $KQI_2$ stream is less than two time slots, normal indicator 504 is also labeled as outlier, and the series of outliers in the $KQI_2$ stream is labeled as an anomaly event. Likewise, the time gap between the outliers in the $KPI_1$ stream is less than two time slots. Accordingly, that series of outliers in the $KPI_1$ stream is also labeled as an anomaly event.

Figure 5D:
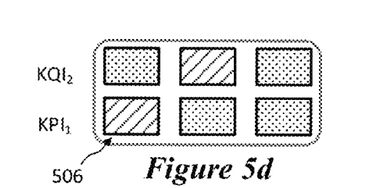

FIG. 5d illustrates the data 500 after the two detected anomaly events have been correlated according to time. As can be seen in FIG. 5d, the two events overlap by one time slot, which is equal to the predefined k value, which in this example is one time slot. Accordingly, the two anomaly events correlate, which may indicate an anomaly in the network 100. As illustrated in FIG. 5d, the remaining data point 506 in the anomaly event is labeled an outlier. Once the anomaly events are correlated and found to indicate an anomaly, a root cause analysis may be performed to determine the cause of the network anomaly.

Figure 6:
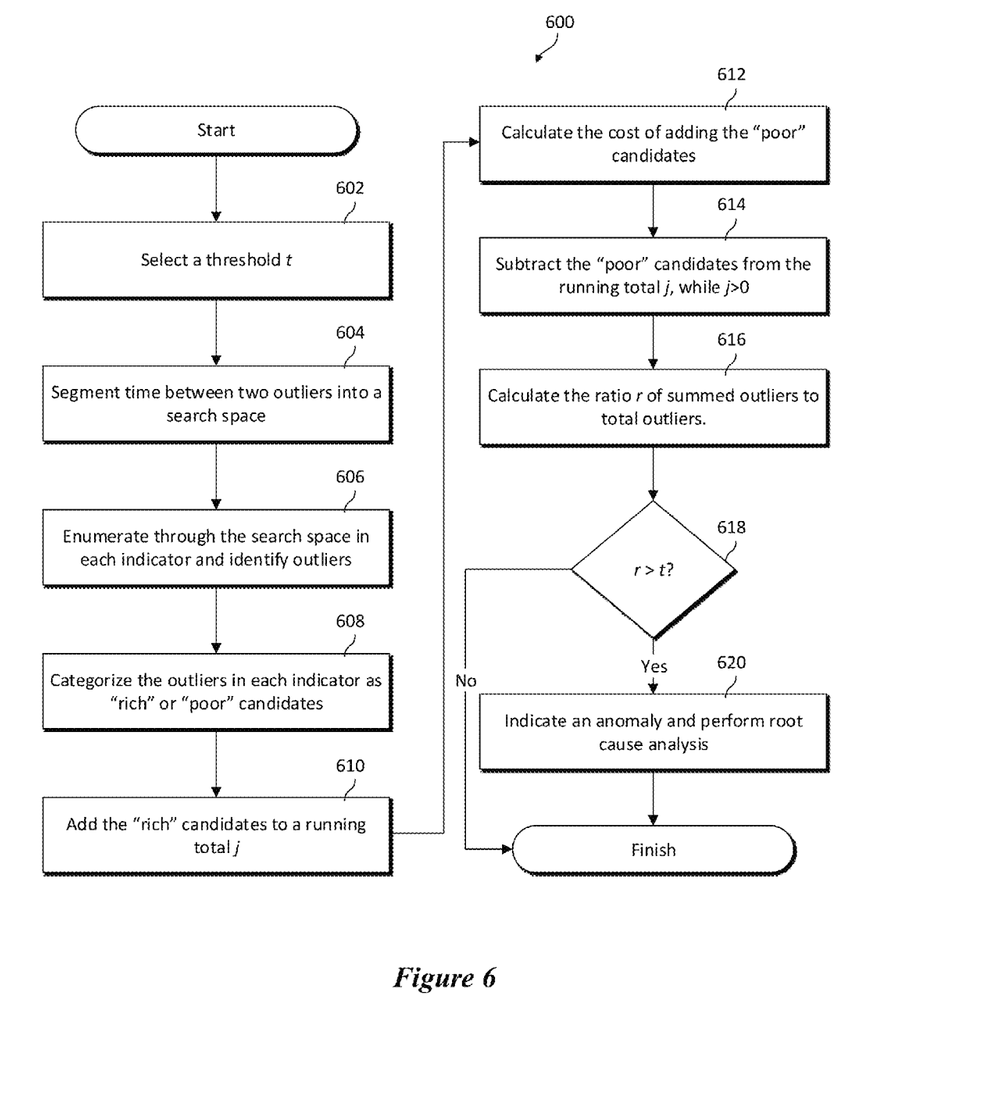
FIG. 6 illustrates a second embodiment method of correlating KPI and KQI outliers.

FIG. 6 illustrates a second embodiment outlier correlation method 600, which may correlate KPI and KQI outliers. Outlier correlation method 600 correlates events across multiple metrics in the time domain to more accurately detect network anomalies. Outlier correlation method 600 may choose a time window and then searches for similar metrics in that time window, in order to more accurately correlate outliers and detect anomalies. The time window may be selected by testing various time window sizes during a testing process and choosing the best candidate. The various time window sizes tested may be selected, for example, by choosing a minimal and maximal interval size and testing each permutation of interval size and location of that interval in a series of outliers. Outlier correlation method 600 may be indicative of operations occurring when performing multi-view anomaly detection, as discussed above with respect to step 206 of FIG. 2.

Outlier correlation method 600 begins by selecting a threshold t (step 602). The threshold t may be a predetermined parameter. The threshold t may be, e.g., a confidence threshold or a termination condition such as marginal confidence.

Outlier correlation method 600 continues by segmenting the time between outliers in an indicator stream into timestamps in order to define a search space (step 604). Because outlier correlation method 600 does not segment the search space into timestamps until after selection of the search space, outlier correlation method 600 can thus be applied to a continuous data source, such as a real time stream of indicators from the network 100. Accordingly, outlier correlation method 600 may be capable of automatically identifying anomalies in a network 100 and generating events for a network operator as the events occur.

Once a search space is identified for an indicator stream, the outlier correlation method 600 continues by enumerating through other indicator streams and searching for outliers that lie in the search space (step 606). An anomaly candidate is generated for each indicator stream if that indicator steam has outliers in the search space. The search space is a time window that outliers from other indicator streams should occur within in order to be considered anomaly candidates.

After anomaly candidates are identified in each indicator stream, each candidate is categorized as a rich candidate or a poor candidate (step 608). The classification of each candidate as rich or poor may be performed according to the quantity of outliers observed in the search space for that candidate. In some embodiments, a candidate may be classified as rich if the quantity of outliers in the candidate is equal to or greater than a predefined quantity n of outliers. Likewise, a candidate may be classified as poor if the quantity of outliers in the candidate is less than n. In some embodiments, an indicator stream may need to contain a minimum quantity of outliers in the search space in order to be classified as a candidate. For example, an embodiment may require an indicator to contain at least two anomalies in the search space before it may be considered a candidate.

After the candidates have been categorized as rich or "poor," the outlier correlation method 600 continues by summing the rich candidates into a running total j (step 610). The rich candidates may correspond to a percentage of outliers in the search space, and they may be adjusted by the threshold t before being summed. For example, if a rich candidate contains three outliers in a search space that is three time slots wide, then the rich candidate may be quantified as: 3/3=1.0. If the threshold t is 0.8, then the amount added to the running total j for this rich candidate may be: 1.0−0.8=0.2.

After the rich candidates have been summed, the outlier correlation method 600 continues by calculating the cost of subtracting poor candidates from the running total j (step 612). The poor candidates may be quantified in a manner similar to the rich candidates. For example, if a poor candidate contains two outlier in a search space that is three time slots wide, then the poor candidate may be quantified as: 2/3=0.66. If the threshold t is 0.8, then the cost of this poor candidate may be: 0.66−0.8=−0.14. Once the cost of each poor candidate has been calculated, the poor candidates may then be sorted by cost.

After cost of each poor candidate has been calculated, the outlier correlation method 600 continues by subtracting the poor candidates from the running total j while the running total j is greater than zero (step 614). Note that because the poor candidates may have been sorted by cost in the previous step, the most costly poor candidates maybe be subtracted first. The poor candidates may continue being subtracted from the running total j until no poor candidates remain, or until subtracting any more would result in j being a negative number.

After the rich and poor candidates have been summed, the outlier correlation method 600 continues by computing the ratio r of summed candidate outliers to total candidate outliers (616). The ratio r may then be compared to a termination condition, such as the threshold t. An anomaly may be indicated if the ratio r exceeds the threshold t (steps 618). If no anomaly is indicated, the outlier correlation method 600 concludes. However, if an anomaly was detected, then root cause analysis may be performed in order to identify the cause of the anomaly (step 620). As discussed above, the root cause may be determined according to the types of quality or performance metrics that contained anomalies, or may also be determined by, e.g., a network operator.

Figure 7:
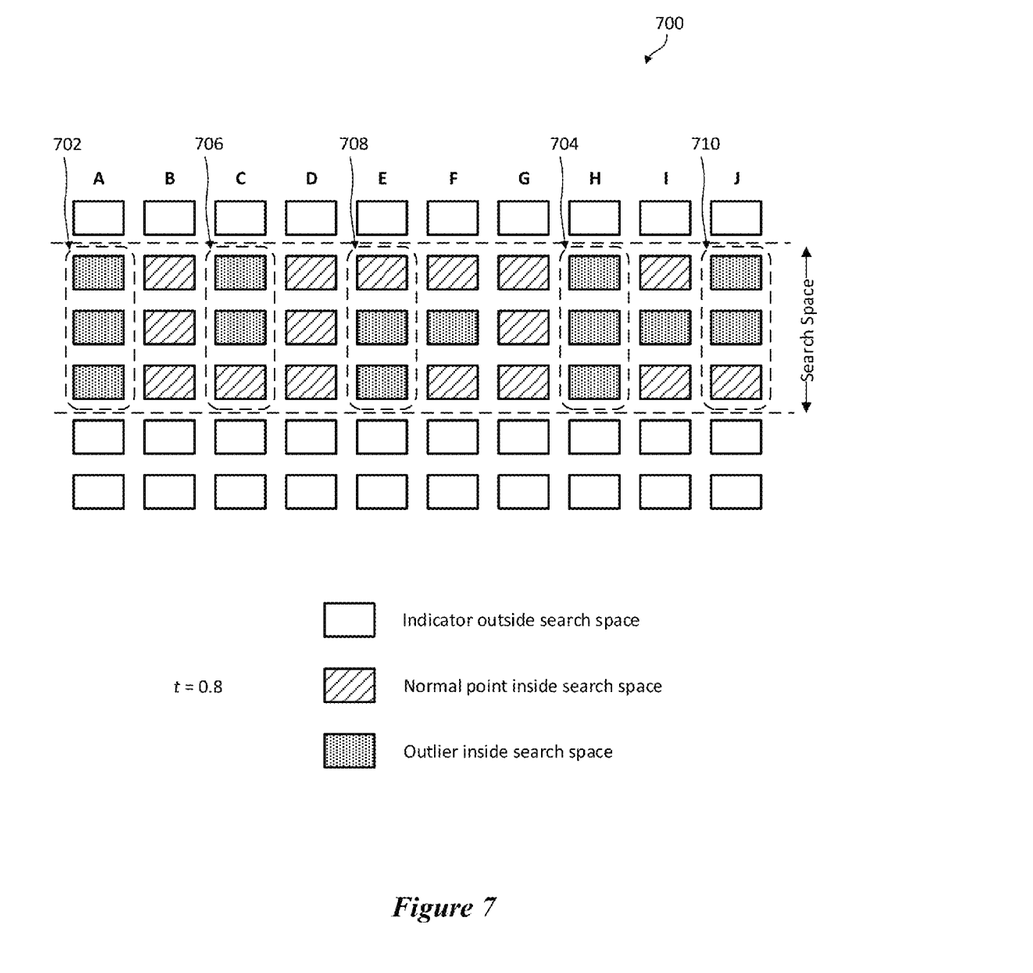
FIG. 7 illustrates an example of a second embodiment method of correlating KPI and KQI outliers.

FIG. 7 illustrates the outlier correlation method 600 applied to data 700. As shown in FIG. 7, there are several indicator streams, labeled A-J, in the data 700. A search space has been previously determined, as discussed above with respect to step 604 of FIG. 6. Each of the candidates, i.e., groups of indicators in the search space, has been analyzed to detect outliers in the candidate, which are indicated as boxes with dotted hash shading. The remaining indicators in each candidate are normal indicators (e.g., not outliers), as indicated with diagonal hash lines. In this example, the threshold t was predefined as 0.8.

The candidates of the data 700 are next categorized as rich or poor candidates. As shown in FIG. 7, there are two rich candidates 702, 704 in the data 700. These candidates have been categorized as rich in this example because all time slots in the candidates are outliers. In some embodiments, the candidates may be categorized as rich if they contain a predefined quantity of outliers. As shown in FIG. 7, there are three poor candidates 706, 708, 710 in the data 700. These candidates have been categorized as poor in this example because they contain at least two outliers. In other embodiments, a greater or lesser threshold of outliers may be required in order to categorize the candidates as "poor."

Once the rich candidates have been categorized, their quantification over the threshold t is summed and added to the running total j. In this example, there are two rich candidates, and each has all three time slots filled with outliers. Accordingly, after quantifying and summing the rich candidates, the running total j will equal: 2*(1.0−0.8)=0.4.

The cost of each poor candidate in the data 700 is next calculated. In this example, the poor candidates 706, 708, 710 each contain two outliers out of a three total possible time slots. Accordingly, the cost of each is calculated as: 0.66−0.8=−0.14. In embodiments where categorization of poor candidates has a lower threshold, a candidate with one outlier may have a cost of: 0.33−0.8=−0.47. Once the cost of each poor candidate is calculated, the candidates are sorted by cost. In this example, each poor candidate has a cost of −0.14, and thus no sorting is required.

After the cost of each poor candidate is calculated, they are next subtracted from the running total j until no more can be subtracted. In this example, the running total j is 0.4 after adding the rich candidates. Thus, only two poor candidates may be subtracted from the running total j. Here, the running total j will be 0.4−2*(0.14)=0.12 after subtracting two poor candidates. Subtracting a third poor candidate would result in the running total j being −0.02, which is less than zero, and so the third poor candidate is not subtracted from the running total j.

Finally, the ratio r of summed outliers to total outliers in the candidates is calculated. In this example, there were 12 total outliers in the candidates: 3 in each rich candidate and 2 in each poor candidate. Further, one poor candidate was not subtracted from the running total j. Accordingly, 10 outliers of the total 12 outliers were summed. Thus, the ratio r is computed as 10/12=0.83. The ratio r of 0.83 is greater than the threshold t of 0.8, and thus an anomaly may be indicated in the data 700. Now that the anomaly has been identified, a root cause of the anomaly may be determined. As discussed above, the root cause may be determined according to, e.g., which indicators were classified as rich and poor candidates.

Figure 8:
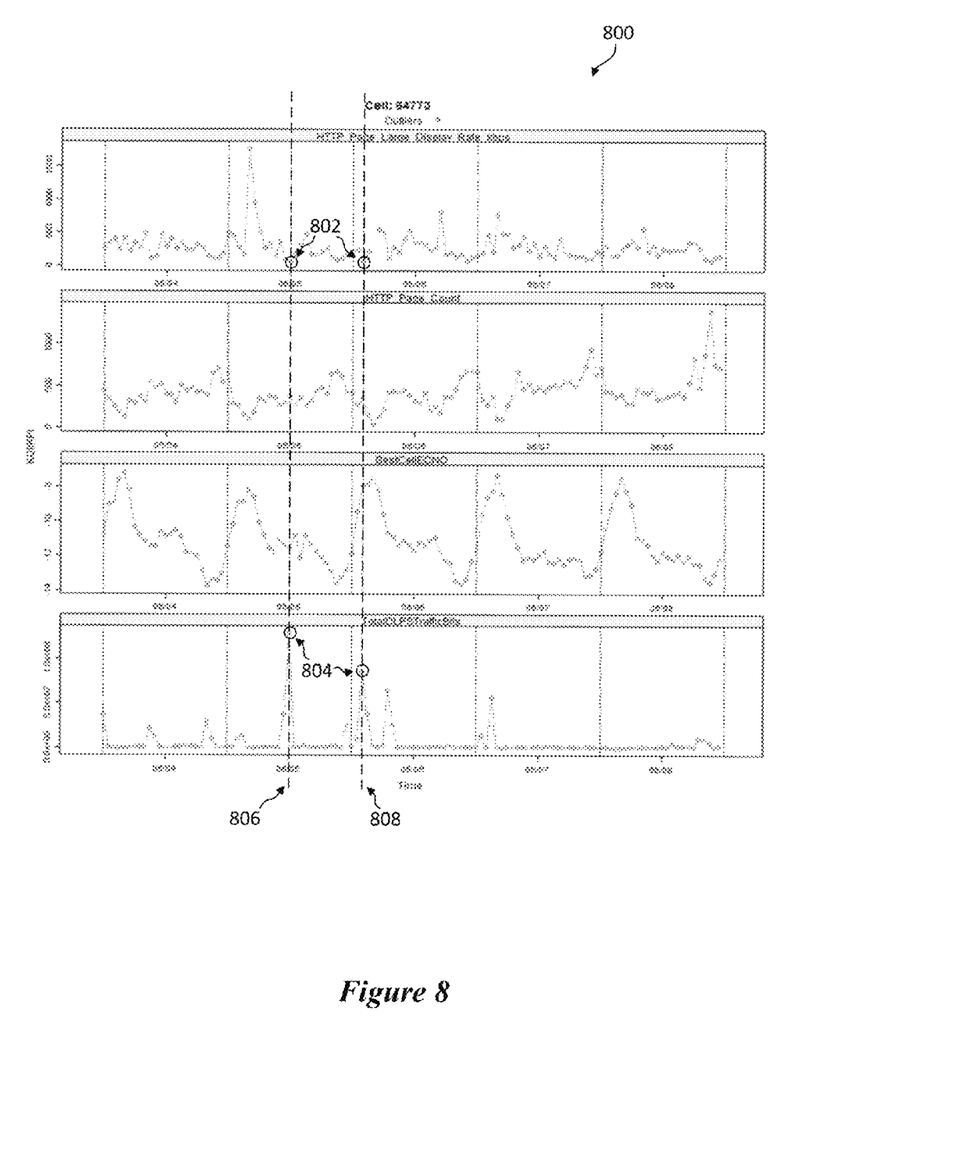
FIG. 8 illustrates an example result of correlating KPI and KQI outliers to detect anomalies.

FIG. 8 illustrates example result 800 of correlating KPI and KQI anomalies. As shown, result 800 has two KQI outliers 802 in a KQI stream. The KQI stream with outliers is the page display rate, in kbps. Result 800 also has two KPI outliers 804 in a KPI stream. As shown by correlation lines 806, 808, the KPI and KQI outliers align in time. Accordingly, the correlated values have been labeled as an anomaly. The combined anomalies of low display rate and high traffic indicate the root cause of the outliers is likely a large surge in total downlink traffic.

Figure 9:
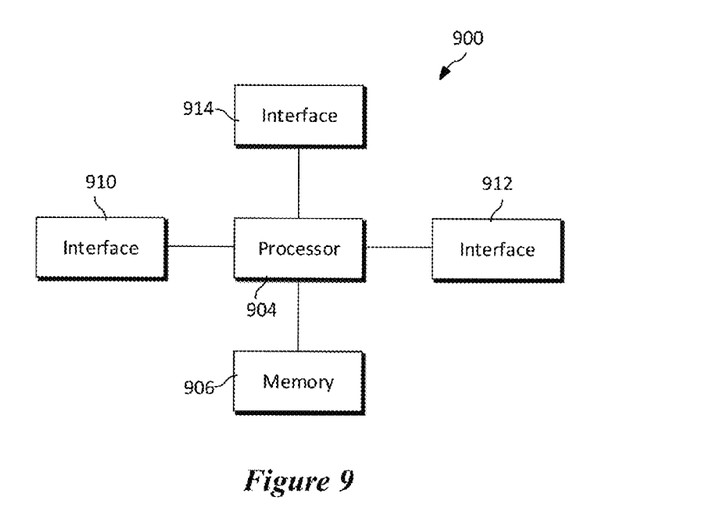
FIG. 9 illustrates a diagram of an embodiment processing system.

FIG. 9 illustrates a block diagram of an embodiment processing system 900 for performing methods described herein, which may be installed in a host device. As shown, the processing system 900 includes a processor 904, a memory 906, and interfaces 910-914, which may (or may not) be arranged as shown in FIG. 9. The processor 904 may be any component or collection of components adapted to perform computations and/or other processing related tasks, and the memory 906 may be any component or collection of components adapted to store programming and/or instructions for execution by the processor 904. In an embodiment, the memory 906 includes a non-transitory computer readable medium. The interfaces 910, 912, 914 may be any component or collection of components that allow the processing system 900 to communicate with other devices/components and/or a user. For example, one or more of the interfaces 910, 912, 914 may be adapted to communicate data, control, or management messages from the processor 904 to applications installed on the host device and/or a remote device. As another example, one or more of the interfaces 910, 912, 914 may be adapted to allow a user or user device (e.g., personal computer (PC), etc.) to interact/communicate with the processing system 900. The processing system 900 may include additional components not depicted in FIG. 9, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 10:
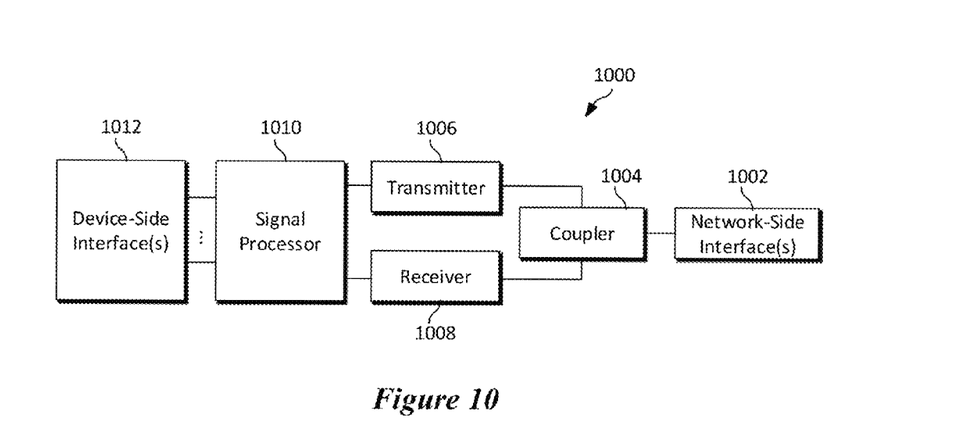
FIG. 10 illustrates a block diagram of a transceiver.

In some embodiments, one or more of the interfaces 910, 912, 914 connects the processing system 900 to a transceiver adapted to transmit and receive signaling over the telecommunications network. FIG. 10 illustrates a block diagram of a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for detecting anomalies in a communication network, the method comprising:
   detecting, by an anomaly detection device, key quality indicator (KQI) outliers in a set of KQIs for a cellular group, each of the KQI outliers corresponding to time slots in which a corresponding KQI metric is abnormal;
   detecting, by the anomaly detection device, key performance indicator (KPI) outliers in a set of KPIs for the cellular group, each of the KPI outliers corresponding to time slots in which a corresponding KPI metric is abnormal;
   correlating, by the anomaly detection device, the KQI outliers for the cellular group with the KPI outliers for the cellular group to identify an anomaly candidate for the cellular group, the anomaly candidate corresponding to an overlap period in which an anomaly event associated with a given KQI outlier overlaps an anomaly event associated with a given KPI outlier, wherein the anomaly event associated with the given KPI outlier corresponds to a consecutive sequence of timeslots in which a time difference between successive instances of the given KPI outlier does not exceed a threshold, and wherein the anomaly event associated with the given KQI outlier corresponds to a consecutive sequence of timeslots during which a time difference between successive instances of the given KQI outlier does not exceed the threshold;
   determining, by the anomaly detection device, a confidence threshold for the anomaly candidate in accordance with a number of timeslots, during the corresponding overlap period, in which instances of both the given KPI outlier and the given KQI outlier are present; and
   detecting, by the anomaly detection device, a root cause for the anomaly candidate and sending a signal that identifies the root cause to a second network device when the confidence threshold for the anomaly candidate exceeds a predetermined threshold.

2. The method of claim 1, wherein correlating the KPI outliers and the KQI outliers to identify the anomaly candidate comprises correlating the KPI outliers with the KQI outliers in accordance with a multi-view correlation algorithm.

3. The method of claim 1, wherein the KPI outliers are detected based on a different detection algorithm than the KQI outliers.

4. The method of claim 1, wherein correlating the KPI outliers and the KQI outliers to identify the anomaly candidate comprises correlating the KPI outliers and the KQI outliers according to time.

5. The method of claim 4, wherein correlating the KPI outliers and the KQI outliers according to time comprises:
   determining whether a first time difference between the KPI outliers is less than an event threshold;
   determining whether a second time difference between the KQI outliers is less than the event threshold; and
   identifying the anomaly candidate in response to the first time difference and the second time difference overlapping.

6. The method of claim 5, wherein determining the confidence threshold for the anomaly candidate comprises determining an amount of overlap between the first time difference and the second time difference.

7. The method of claim 4, wherein correlating the KPI outliers and the KQI outliers according to time comprises:
   selecting a time window;
   categorizing the KPI outliers in the time window as rich candidates or poor candidates according to a quantity of the KPI outliers;
   categorizing the KQI outliers in the time window as rich candidates or poor candidates according to a quantity of the KQI outliers;
   adding the rich candidates to a running total;
   subtracting the poor candidates from the running total; and
   identifying the anomaly candidate in response to the running total.

8. The method of claim 7, wherein determining the confidence threshold for the anomaly candidate comprises:
   summing a quantity of outliers in the rich candidates added to the running total and a quantity of outliers in the poor candidates subtracted from the running total to produce a counted outlier total; and
   producing the confidence threshold in response to a ratio of the counted outlier total to a total quantity of outliers in the rich candidates and the poor candidates exceeding an event threshold.

9. The method of claim 1, wherein detecting the KPI outliers for the cellular group comprises:
   selecting training data according to training and testing observations of the set of KPI indicators;
   calculating a sliding window according to the training data, the sliding window comprising a top threshold and a bottom threshold; and
   selecting data in the set of KPI indicators that is greater than the top threshold or less than the bottom threshold.

10. An anomaly detector comprising:
    a processor; and
    a non-transitory computer-readable storage medium storing a program to be executed by the processor, the program including instructions to:
    detect key quality indicator (KQI) outliers in a set of KQIs for a cellular group, each of the KQI outliers corresponding to time slots in which a corresponding KQI metric is abnormal;
    detect key performance indicator (KPI) outliers in a set of KPI for the cellular group, each of the KPI outliers corresponding to time slots in which a corresponding KPI metric is abnormal;
    correlate the KQI outliers for the cellular group with the KQI outliers for the cellular group to identify an anomaly candidate for the cellular group, the anomaly candidate corresponding to an overlap period in which an anomaly event associated with a given KQI outlier overlaps an anomaly event associated with a given KPI outlier, wherein the anomaly event associated with the given KPI outlier corresponds to a consecutive sequence of timeslots in which a time difference between successive instances of the given KPI outlier does not exceed a threshold, and wherein the anomaly event associated with the given KQI outlier corresponds to a consecutive sequence of timeslots during which a time difference between successive instances of the given KQI outlier does not exceed the threshold;
    determine a confidence threshold for the anomaly candidate in accordance with a number of timeslots, during the corresponding overlap period, in which instances of both the given KPI outlier and the given KQI outlier are present; and
    detect a root cause for the anomaly candidate and send a signal from the anomaly detector to a network device that identifies the root cause when the confidence threshold for the anomaly candidate exceeds a predetermined threshold.

11. The anomaly detector of claim 10, wherein the instructions to correlate the KQI outliers and the KQI outliers comprises an instruction to correlate the KPI outliers with the KQI outliers in accordance with a multi-view correlation algorithm.

12. The anomaly detector of claim 11, wherein the instructions to correlate the KPI outliers with the KQI outliers in accordance with the multi-view algorithm includes instructions to:
    determine whether a first time difference between the KQI outliers is less than an event threshold;
    determine whether a second time difference between the KQI outliers is less than the event threshold; and
    identify the anomaly candidate in response to the first time difference and the second time difference overlapping by an overlap threshold.

13. The anomaly detector of claim 12, wherein the instructions to determine the confidence threshold for the anomaly candidate includes instructions to determine an amount of overlap between the first time difference and the second time difference.

14. The anomaly detector of claim 13, wherein the instructions to determine the confidence threshold for the anomaly candidate includes instructions to:
    sum a quantity of outliers in the rich candidates added to the running total and a quantity of outliers in the poor candidates subtracted from the running total to produce a counted outlier total; and
    produce the confidence threshold in response to a ratio of the counted outlier total to a total quantity of outliers in the rich candidates and the poor candidates exceeding an event threshold.

15. The anomaly detector of claim 11, wherein the instructions to correlate the KPI outliers with the KQI outliers in accordance with the multi-view algorithm include instructions to:
    categorize the KQI outliers as rich candidates or poor candidates;
    categorize the KQI outliers as rich candidates or poor candidates;
    add the rich candidates to a running total;
    subtract the poor candidates from the running total while the running total exceeds a minimum threshold; and
    identify the anomaly candidate in response to a quantity of rich candidates added to the running total and a quantity of poor candidates subtracted from the running total.

16. The anomaly detector of claim 10, wherein the KPI outliers are detected based on a different detection algorithm than the KQI outliers.

17. The anomaly detector of claim 10, wherein the instructions to correlate the KPI outliers and the KQI outliers to identify the anomaly candidate comprises correlating the KPI outliers and the KQI outliers according to time.

18. The anomaly detector of claim 10, wherein the instructions to detect the KPI outliers for the cellular group includes instructions to:
   select training data according to training and testing observations of the set of KPI indicators;
   calculate a sliding window according to the training data, the sliding window comprising a top threshold and a bottom threshold; and
   select data in the set of KPI indicators that is greater than the top threshold or less than the bottom threshold.

19. A computer program product comprising a non-transitory computer readable storage medium storing programming, the programming including instructions to:
   detect key quality indicator (KQI) outliers in a set of KQIs for a cellular group, each of the KQI outliers corresponding to time slots in which a corresponding KQI metric is abnormal;
   detect key performance indicator (KPI) outliers in a set of KPI for the cellular group, each of the KPI outliers corresponding to time slots in which a corresponding KPI metric is abnormal;
   correlate the KQI outliers for the cellular group with the KQI outliers for the cellular group to identify an anomaly candidate for the cellular group, the anomaly candidate corresponding to an overlap period in which an anomaly event associated with a given KQI outlier overlaps an anomaly event associated with a given KPI outlier, wherein the anomaly event associated with the given KQI outlier corresponds to a consecutive sequence of timeslots in which a time difference between successive instances of the given KPI outlier does not exceed a threshold, and wherein the anomaly event associated with the given KQI outlier corresponds to a consecutive sequence of timeslots during which a time difference between successive instances of the given KQI outlier does not exceed the threshold;
   determine a confidence threshold for the anomaly candidate in accordance with a number of timeslots, during the corresponding overlap period, in which instances of both the given KPI outlier and the given KQI outlier are present; and
   detect a root cause for the anomaly candidate and send a signal to a network device that identifies the root cause when the confidence threshold for the anomaly candidate exceeds a predetermined threshold.

20. The computer program of claim 19, wherein the instructions to correlate the KQI outliers and the KQI outliers comprises an instruction to correlate the KPI outliers with the KQI outliers in accordance with a multi-view correlation algorithm.

21. The computer program of claim 20, wherein the instructions to correlate the KPI outliers with the KQI outliers in accordance with the multi-view algorithm includes instructions to:
   determine whether a first time difference between the KQI outliers is less than an event threshold;
   determine whether a second time difference between the KQI outliers is less than the event threshold; and
   identify the anomaly candidate in response to the first time difference and the second time difference overlapping by an overlap threshold.

22. The computer program of claim 21, wherein the instructions to determine the confidence threshold for the anomaly candidate includes instructions to determine an amount of overlap between the first time difference and the second time difference.

23. The computer program of claim 22, wherein the instructions to determine the confidence threshold for the anomaly candidate includes instructions to:
   sum a quantity of outliers in the rich candidates added to the running total and a quantity of outliers in the poor candidates subtracted from the running total to produce a counted outlier total; and
   produce the confidence threshold in response to a ratio of the counted outlier total to a total quantity of outliers in the rich candidates and the poor candidates exceeding an event threshold.

* * * * *